United States Patent [19]

Derenzo

[11] Patent Number: 4,672,207
[45] Date of Patent: Jun. 9, 1987

[54] READOUT SYSTEM FOR MULTI-CRYSTAL GAMMA CAMERAS

[75] Inventor: Stephen E. Derenzo, Pinole, Calif.

[73] Assignee: The United States of America as represented by the United States Department of Energy, Washington, D.C.

[21] Appl. No.: 768,080

[22] Filed: Aug. 21, 1985

[51] Int. Cl.[4] .......................................... G01T 1/164
[52] U.S. Cl. .................. 250/363 S; 250/366; 250/367; 250/369; 250/370
[58] Field of Search ............... 250/363 SR, 366, 367, 250/369, 370 C, 370 I, 370 H, 370 G

[56] References Cited

U.S. PATENT DOCUMENTS

| | | | |
|---|---|---|---|
| 4,055,765 | 10/1977 | Gerber et al. | 250/370 |
| 4,059,766 | 11/1977 | Rougeot | 250/366 |
| 4,070,578 | 1/1978 | Timothy et al. | 250/336.1 |
| 4,303,860 | 12/1981 | Bjorkholm et al. | 250/366 |
| 4,394,576 | 7/1983 | Tanaka et al. | 250/366 |
| 4,437,007 | 3/1984 | Koslow et al. | 250/366 |

OTHER PUBLICATIONS

Sveinsdottir et al., "A Multidetector Camera with 254 Channels", J. Nucl. Med., 18 (2), Feb. 1977, pp. 168-174.
Petrillo et al., "Scintillating Detection with Large-Area Reach-Through Avalanche Photodiodes", IEEE Trans. Nucl. Sci., NS-31 (1), Feb. 1984 pp. 417-423.
Capasso, "Avalanche Photodiodes with Enhanced Ionization Rates Ratio: Towards A Solid State Photomultiplier", IEEE Trans. Nucl. Sci., NS-30 (1) Feb. 1983, pp. 424-425.

Primary Examiner—Carolyn E. Fields
Attorney, Agent, or Firm—Clifton E. Clouse, Jr.; Roger S. Gaither; Judson R. Hightower

[57] ABSTRACT

A radioisotope camera (10) having an array (12) of scintillation crystals (13) arranged in N rows and M columns and adapted to be struck by gamma-rays from a subject, a separate solid state photodetector (15) optically coupled to each crystal (13), and N+M amplifiers (24) connected to the photodetectors (15) to distinguish the particular row and column of an activated photodetector. One of the anode or cathode leads (33 or 34) of each photodetector (15) is coupled to the row amplifier (24) associated with the row containing that photodetector while the other of the two leads (34 or 33) is coupled to the column amplifier (24) associated with the column containing that photodetector.

19 Claims, 3 Drawing Figures

READOUT SYSTEM FOR MULTI-CRYSTAL GAMMA CAMERAS

The U.S. Government has rights in this invention pursuant to Contract No. DE-AC03-76SF00098 between the U.S. Department of Energy and the University of California, Lawrence Berkeley Laboratory.

BACKGROUND OF THE INVENTION

This invention relates to radioisotope cameras, and particularly to an improved, position-sensitive readout system for a multi-crystal camera.

Radioisotope cameras have considerable important uses in medical diagnosis and research. They have a considerable advantage over the use of X-ray techniques in that they are sensitive to minute amounts of certain radioactive tracer compounds. In use, a small quantity of a gamma-ray emitting radioactive substance is injected into a patient. The choice of radioactive isotope depends on its half-life, activity, dose rate, and many other factors. Certain isotopes are highly specific, and tend to concentrate in certain organs of the body. This selective accumulation permits visualization the biological function of almost every organ of the human body. Although the resolution of radioisotope cameras is not equal to that obtained in X-ray radiographs, the size, shape, position and function of the organs can be determined, and often lesions can be located in them.

In general, a radioisotope camera consists of a pinhole or multi-channel collimator and a position-sensitive gamma-ray detector.

A very commonly used radioisotope camera is the gamma camera invented by Hal O. Anger at the Donner Laboratory, University of California, Berkeley. H. O. Anger: "Survey of Radioisotope Cameras," *ISA Transactions*, 5:311-334, 1966. It consists of a single NaI (Tl) crystal, typically 12 inches in diameter and 0.5 inches thick, and a number of photomultiplier tubes which are optically coupled to the crystal. A gamma-ray, from an emitting source, which strikes the crystal will cause an optical scintillation flash that is detected by the phototubes. A network of capacitors connects the output of all phototubes to 4 amplifiers where outputs are combined in a special circuit that determines the x and y spatial coordinates of the center of intensity of the scintillation flash. The locations of a sufficient scintillation events will thus enable a visual representation of the gamma-ray emitting source to be obtained. A significant disadvantage of this design is that the entire crystal is used for the detection of each gamma-ray, resulting in a maximum detectable event rate of below 50,000 events per second.

This limitation was largely overcome by the development of a multi-crystal gamma camera by Merrill A. Bender and Monte Blau, described in M. A. Bender, M. Blau: "The Autofluoroscope," Nucleonics, Vol. 21, No. 10, October, 1963, pp. 52-56. This camera uses an N×M array of closely packed 10 mm×10 mm NaI (Tl) scintillation crystals, each coupled to two of N+M remotely-positioned phototubes by a pair of long twisting light pipes. One of the phototubes determines the row of a scintillation crystal and the other phototube determines the column. With this design, useful event rates of 200,000/second have been achieved. However, this design has a number of significant problems such as the very poor light transfer from the scintillation crystals to the remote phototubes and the difficulty of fabricating and assembling the 2×M×N lightpipes for a large camera.

The light transfer from a mosaic of scintillation crystals to the phototubes could, of course, be greatly increased by disposing the phototubes immediately adjacent to the crystals. Although the scintillator crystals can be made as small as desired, the phototubes cannot. As a consequence, the spatial resolution would be determined by the size of the closely packed phototubes. Much research, in many countries, has been done to make phototubes as small as possible to improve resolving power, but the smallest phototube presently available is 10 mm in diameter. Such size is a severe limitation on resolution. With the Anger camera principle, resolution of 3-4 mm has been achieved. However, the deadtime from the afterglow in the common large crystal is much worse than that of a mosaic of crystals.

Further, phototubes are relatively expensive and the individual coupling of phototubes to a mosaic of scintillation crystals would be very costly.

SUMMARY OF THE INVENTION

It is an object of the present invention to provide a radioisotope camera which has a high event rate and high resolving power.

It is a further object of the invention to provide a radioisotope camera having a scintillation crystal and a light detector coupled thereto wherein there is a high efficiency of light transfer and wherein the light detection is much less costly than a phototube.

Yet another object of the invention is the provision of a radioisotope camera having scintillation crystals and solid state photodetectors coupled thereto, and in which the charges induced in the two leads of an activated photodetector are separately amplified in a position-determining readout system.

Additional objects, advantages and novel features of the invention will be set forth in the description which follows, and in part will become apparent to those skilled in the art upon examination of the following or may be learned from practice of the invention. The objects and advantages of the invention may be realized, and attained by means of the instrumentalities and combinations particularly pointed out in appended claims.

To achieve the foregoing and other objects, and in accordance with the present invention, as embodied and broadly described herein, a radioisotope camera is provided, such camera having a mosaic of scintillation crystals arranged in N rows and M columns, a solid state photodetector optically coupled to each crystal to receive optical radiation directly therefrom, and a row-and-column readout using N+M amplifiers for the photodetectors.

BRIEF DESCRIPTION OF THE DRAWINGS

The accompanying drawings, which are incorporated in and form a part of the application and, together with the description, serve to explain the principles of the invention.

DESCRIPTION OF THE PREFERRED EMBODIMENT

Figure 1:
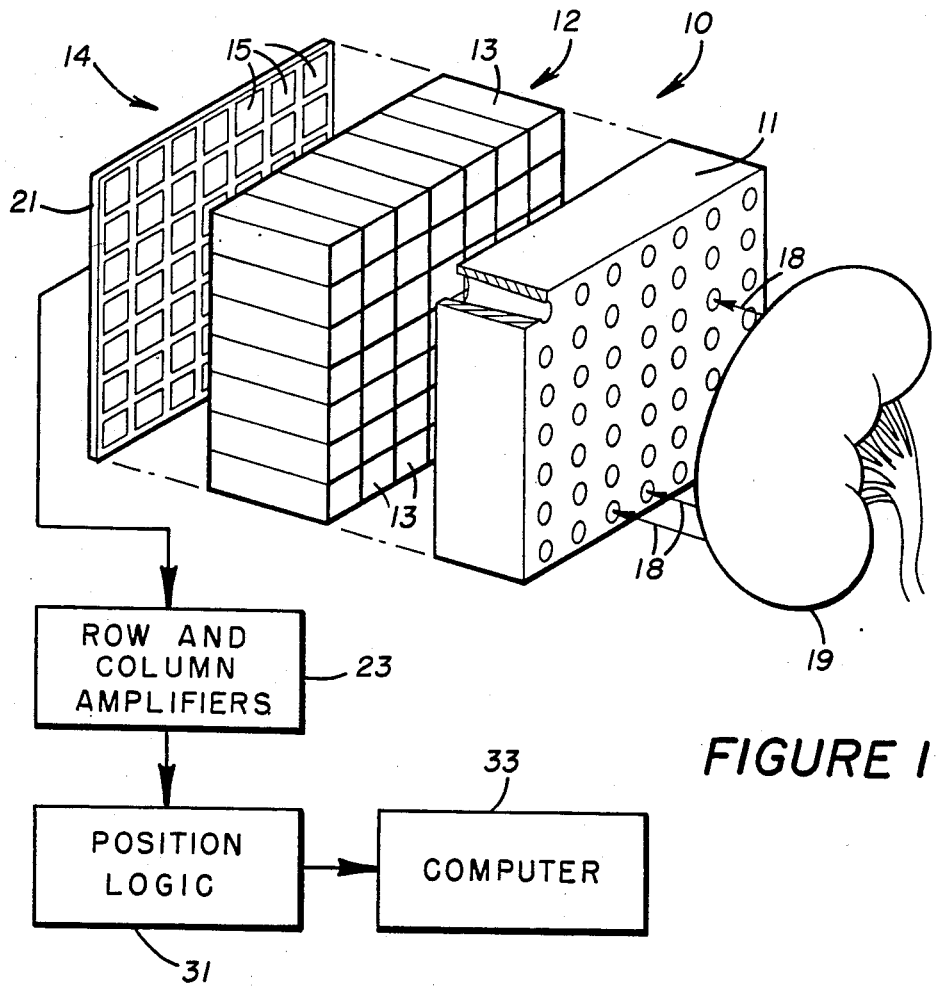
FIG. 1 is simplified perspective view of a radioisotope camera made in accordance with the present invention.

Referring now to the drawings, which illustrate preferred embodiments of the invention, and in particular to FIG. 1, the basic elements of the gamma camera 10 include a multichannel collimator 11, an array 12 of closely packed individual scintillation elements 13, and an array 14 of individual solid state photodetectors 15.

The scintillation elements 13 are arranged side to side to each other in N rows and M columns, N and M being integers, with the sides of the elements being suitably coated so that the elements will not interact optically with each other. For purposes of simplicity, 25 scintillation elements are shown in FIG. 1, arranged in 5 rows and 5 columns. However, the scintillation array 12 may be any desired number of elements, arranged in any desired number of rows and desired number of columns. The number of rows need not equal the number of columns and the number of elements may vary from row to row or from column to column.

The multichannel collimator 11 has a plurality of channels 17 therethrough, one channel for each scintillation element 13. The collimator 11 is preferably made of lead, and the scintillation element array 12 is also lead shielded therearound so that only gamma-rays (indicated by arrows 18) from subject 19 can pass through the collimator channels 17 and strike the individual scintillation elements 13.

The solid state photodetectors 15 are also arranged in N rows and M columns and are optically coupled to the scintillation elements 13 the photodetectors 15 are positioned so that they receive optical radiation directly from the scintillation elements, there being one photodetector 15 associated with each of the scintillation elements 13, with each photodetector being positioned to receive optical radiation from only the scintillation element with which it is associated.

The solid state photodetectors 15 are preferably silicon avalanche photodiodes, on a ceramic backing 21. Separate bias voltage may be required to establish the same avalanche gain on all the devices. Silicon photodiodes, germanium arsenide photodiodes, or mercuric iodide photodetectors may also be used.

Almost any scintillation element 13 may be used. However, since most of the solid-state photodetectors are not sensitive to scintillation light shorter than 400 nm, bismuth germanate or activated cesium iodide crystals are preferred.

The light from the scintillation elements 13 makes electron-hole pairs in the solid state photodetectors 15. If both, or only one, of these charge carrier species has a high mobility, charge is rapidly induced on both leads of the solid state device. In silicon, both carriers are fast, but only the electrons are fast in mercuric iodide.

Figure 2:
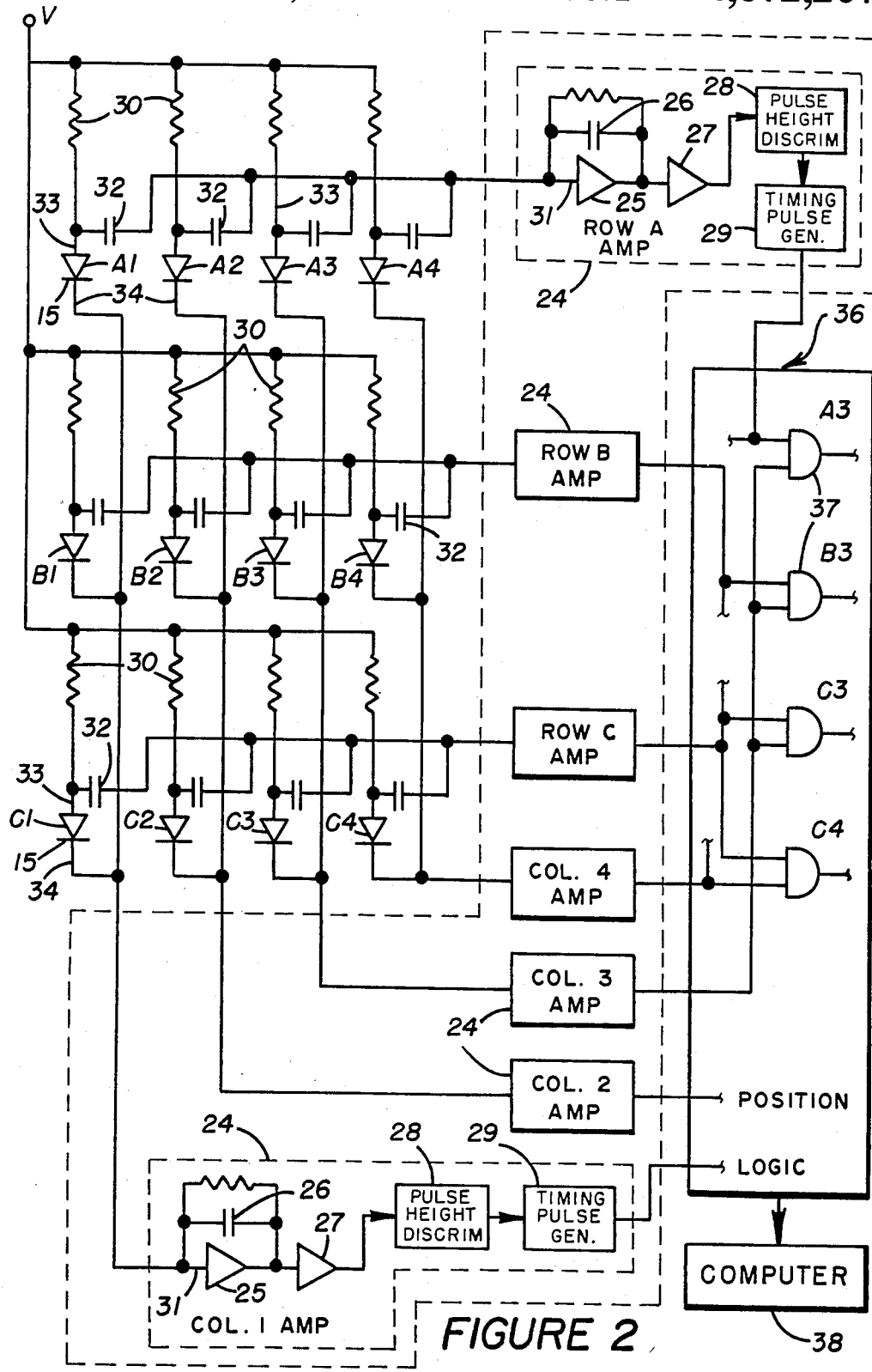
FIG. 2 is a block diagram of the photodetectors and the row and column amplifiers of the present invention.

The photodetectors 15 are connected to the row and column amplifiers 23, generally as shown in FIG. 2. For purposes of simplicity, FIG. 2 shows a system with only 12 photodetectors 15, arranged in three rows and four columns, and connected to N+M, or seven, amplifiers 24. (A system having five rows and five columns of scintillation elements, as in FIG. 1, would require N+M, or ten, amplifiers 24.)

Each amplifier 24 comprises a charge amplifier 25 having a capacitive negative feedback circuit 26, followed by a pulse shaping amplifier 27, a pulse height discriminator 28, and a timing pulse generator 29. By the use of negative feedback, the input impedance of each charge amplifier 25 is very low compared with the impedance of photodetectors 15 and their biasing resistors 30. The input 31 of the row A amplifier 24 is connected through capacitors 32 to the anode leads 33 of each of the A1, A2, A3 and A4 photodetectors 15, and the input 31 of the column 1 amplifier 24 is connected to the cathode leads 34 of each of the A1, B1 and C1 photodetectors 15. The row B and C amplifiers 24 are similarly connected to the anode leads of the B1-B4 row and the C1-C4 row, of respectively, of the photodetectors 15, and the column 2, 3 and 4 amplifier are similarly connected to the cathode leads of the A2-C4 columns of the photodetectors 15. The anode leads 33 of all of the photodetectors 15 are connected through the biasing resistors 30 to a source voltage V.

If the A1 photodetector 15 is activated by light from the scintillation element associated therewith, a charge will be created within the photodetector and will separate rapidly in the electric field and induce a charge on both leads. The charge on the anode lead 33 will be coupled through capacitor 32 to the input 31 of the row A amplifier 24, and the charge on the cathode lead 34 will be directly coupled to the input 31 of the column 1 amplifier 24, so that the two charge amplifiers 25 of the row A and column 1 amplifiers 24 will each produce a voltage pulse which is shaped by the pulse shaping amplifier 27 and applied to the pulse height discriminator 28. If the magnitude of the event sensed by the charge amplifier 25 is sufficient, the pulse height discriminator 28 will trigger the timing pulse generator 29 to produce a narrow timing pulse, e.g. in the order of 10 nsec, at the output of amplifier 24. The amplifiers 24 are designed so that the two timing pulses from the two amplifiers responding to a single scintillation are substantially contemporaneous. The high impedance of the other, non-activated, photodetectors 15 will cause them to act effectively as insulators so that the induced charges on the leads of the A1 photodetector are blocked from all of the other row and column amplifiers.

The above operation has been confirmed by preliminary tests made with two charge amplifiers connected to opposite leads of a low noise silicon photodiode. A bismuth germanate crystal was cemented to the photosensitive surface of the photodiode, and this detector assembly was cooled to $-80°$ C. As expected, charge liberated in the photodiode by bismuth germanate scintillation light was detected by both charge amplifiers, with nearly equal amplitude and good signal-to-noise ratio. On the other hand, an equivalent charge injected at the input of either one of the charge amplifiers through an external calibration capacitor was not detected by the other charge amplifier.

The outputs of the individual row and column amplifiers 24 are connected to a position logic circuit 36 which functions to determine which individual photodetector has been optically activated. For example, the position logic circuit 36 may use a number of AND gates 37 equal to the number of photodetectors 15 with the two inputs of each AND gate being coupled to a unique combination of output terminals of one row and one column amplifier 24. Thus, if the B3 photodetector is optically activated and the row B and column 3 amplifiers 24 respond thereto, the two contemporaneous timing pulses will cause the output of the B3 AND gate 37 to go high while the outputs of all the other AND gates will remain low. Conventional rejection circuits (not shown) are incorporated in the position logic circuit 36 to prevent errors in the event that two photodetectors are simultaneously activated. The position logic circuit 36 is connected to a suitable computer 38 to store the location of the gamma-ray events detected by the scintillation element array 12.

In the system shown in FIG. 2, seven amplifiers 24 can distinguish which of 12 photodetectors has been optically activated. Likewise, (20+50=70) amplifiers can distinguish charge on any particular one of (20×50=1,000) photodetectors activated by light from one thousand scintillation elements.

The number of amplifiers 24 could be further reduced to 4 by a network of capacitors, as used in the aforementioned Anger camera, but the maximum useful event rate would be substantially reduced because the entire system would be dead for typically 2 μsec after each interaction. In the present invention, only one scintillation element and two amplifiers are used for the detection of each gamma-ray. Another gamma-ray can be detected almost simultaneously after (at least 10 nsec, in principle) by another scintillation element 13 in a different row and column.

Figure 3:
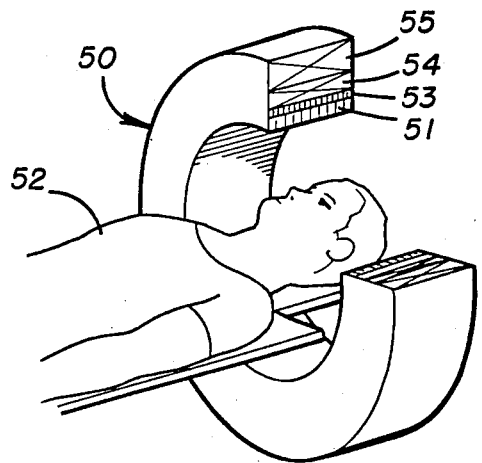
FIG. 3 is a simplified perspective view of a tomograph design using the present invention and adapted to encircle a patient.

The present invention also has utility with respect to the type of radioisotope cameras referred to as positron cameras. Such a camera 50, as generally illustrated in FIG. 3, consists of an array 51 of hundreds of scintillation elements 13 in a ring surrounding the subject 52. An emitted positron travels only a short distance before it encounters an electron and undergoes annihilation radiation, producing two 511 keV gamma-rays traveling in opposite directions. Assuming no scattering, the two gamma-rays strike two scintillation elements 180° from each other in the scintillation ring array 51. The scintillation flashes will be detected by an array 53 of solid state photodetectors, as above described. Row and column amplifiers 54 and a position logic circuit 55 will then distinguish the activated scintillation elements. In a positron camera, the coincidence of the two gamma-rays must be detected and speed is necessary for such coincidence detection. Accordingly, solid state photodetectors must be used which have response speeds comparable to the speeds of the phototubes that are presently used in positron cameras.

If the system of FIG. 3 is modified by adding a conventional rotating collimator through which gamma-rays from the subject will pass to strike the array 51 of scintillation elements 13, single photon emitters can be tomographically imaged.

The foregoing description of the preferred embodiments has been presented for purposes of illustration and description. It is not intended to be exhaustive or to limit the invention to the precise forms described, and obviously many modifications and variations are possible in light of the above teaching. The embodiments were chosen in order to explain most clearly the principles of the invention and its practical application, thereby to enable others in the art to utilize most effectively the invention in various embodiments and with various modifications as are suited to the particular use contemplated. For example, instead of using an array of scintillation elements to provide direct individual excitation of the solid state photodetectors, a lens or pinhole might be used to image a remote source of spatially distributed light flashes on an array of individual photodetectors. It is intended that the scope of the invention be defined by the claims appended hereto.

I claim:

1. A radioisotope camera, including:

a plurality of scintillation elements in close proximity to each other and arranged in N rows and M columns, N and M being integers, each scintillation element being capable of converting gamma-ray radiation to optical radiation, a plurality of solid state photodetectors arranged in N rows and M columns and positioned to receive optical radiation directly from said scintillation elements, there being one photodetector associated with each of said scintillation elements, each of said photodetectors being positioned to receive optical radiation from only the scintillation element with which it is associated, N+M amplifiers, one amplifier associated with each row of said photodetectors and one amplifier associated with each column of said photodetectors, connecting means connecting said photodetectors to said amplifiers so that an amplifier associated with any row of photodetectors will respond to detection of optical radiation of any of the photodetectors in that row, and so that an amplifier associated with any column of photodetectors will respond to detection of optical radiation of any of the photodetectors in that column, position logic means for determining from the responses of the row and column amplifiers the particular row and column of a photodetector receiving optical radiation from the scintillation element with which it is associated.

2. A radioisotope camera as set forth in claim 1, and further including:

a multichannel collimator disposed adjacent said scintillation elements and having a separate collimating channel for each of said scintillation elements.

3. A radioisotope camera as set forth in claim 1 wherein said photodetectors are silicon avalanche photodiodes.

4. A radioisotope camera as set forth in claim 1 wherein said photodetectors are silicon photodiodes, germanium arsenide photodiodes, or mercuric iodide photodetectors.

5. A radioisotope camera as set forth in claim 1 wherein said scintillation elements are crystals of bismuth germanate or activated cesium iodide.

6. A radioisotope camera as set forth in claim 5 wherein said photodetectors are silicon avalanche photodiodes.

7. A radioisotope camera as set forth in claim 5 wherein said photodetectors are silicon photodiodes, germanium arsenide photodiodes, or mercuric iodide photodetectors.

8. A radioisotope camera as set forth in claim 1 wherein said amplifiers each include a low-input-impedance charge amplifier followed by a pulse shaping amplifier.

9. A radioisotope camera as set forth in claim 1, whererin each solid state photodetector has an anode lead and a cathode lead, wherein each of said amplifiers includes a charge amplifier having an input, wherein said connecting means includes means coupling the same one of the anode or cathode leads of each photodetector in a row of photodetectors to the input of the charge amplifier associated with that row, and includes means coupling the other lead of each photodetector in a column of photodetectors to the input of the charge amplifier associated with that column.

10. A radioisotope camera as set forth in claim 9 wherein said connecting means includes a capacitor for each photodetector coupling the anode of the photodetector to the charge amplifier associated therewith.

11. In a radioisotope camera as set forth in claim 10 wherein said photodetectors are silicon photodiodes, silicon avalance photodiodes, germanium arsenide photodiodes or mercuric iodide photodetectors.

12. In a radioisotope camera,
a scintillation element capable of converting gamma-ray radiation to optical radiation,
a solid state photodetector positioned to receive optical radiation directly from said scintillation element, said photodetector having an anode lead and a cathode lead,
a source voltage,
a resistor connecting said anode lead to said source voltage,
a first charge amplifier having an input,
coupling means coupling the input of said first charge amplifier to said anode lead of said photodetector,
a second charge amplifier having an input coupled to said cathode lead of said photodetector.

13. In a radioisotope camera as set forth in claim 12 wherein said photodetector is a silicon photodiode, a silicon avalanche photodiode, a germanium arsenide photodiode or a mercuric iodide photodetector.

14. In a radioisotope camera as set forth in claim 12, wherein said coupling means includes a capacitor connected between said input of said first charge amplifier and said anode lead of said photodetector.

15. In a radioisotope camera as set forth in claim 14 wherein said photodetector is a silicon photodiode, a silicon avalanche photodiode, a germanium arsenide photodiode or a mercuric iodide photodetector.

16. In a light sensing device,
a plurality of solid state photodetectors positioned to individually receive optical radiation, arranged in N rows and M columns, and having anode and cathode leads, N and M being integers,
N+M charge amplifiers each having an input, there being one charge amplifier for each row of said photodetectors and one charge amplifier for each column of said photodetectors,
coupling means coupling the inputs of each of the charge amplifiers associated with the N rows of photodetectors to the same of the anode or cathode leads of all of the photodetectors in the row thereof with which the charge amplifier is associated, and coupling the inputs of each of the charge amplifiers associated with the M rows of photodetectors to the other of the anode or cathode leads of all of the photodetectors in the column thereof with which the charge amplifier is associated.

17. In a light sensing device as set forth in claim 16 wherein each photodetector is a silicon photodiode, a silicon avalanche photodiode, a germanium arsenide photodiode or a mercuric iodide photodetector.

18. In a light sensing device as set forth in claim 16, and further including:
a source voltage,
means connecting the anodes of all of said solid state photodetectors through individual resistors to said source voltage,
and wherein said coupling means includes a separate capacitor connected between the anode of each photodetector and the input of the charge amplifier to which the photodetector is coupled.

19. In a light sensing device as set forth in claim 18 wherein each photodetector is a silicon photodiode, a silicon avalanche photodiode, a germanium arsenide photodiode or a mercuric iodide photodetector.

* * * * *